United States Patent
Velde et al.

(10) Patent No.: US 8,527,124 B2
(45) Date of Patent: Sep. 3, 2013

(54) TRACTION CONTROL METHOD AND APPARATUS FOR A VEHICLE WITH INDEPENDENT DRIVES

(75) Inventors: Todd F. Velde, Dubuque, IA (US); Mark J. Cherney, Potosi, WI (US)

(73) Assignee: Deere & Company, Moline, IL (US)

( * ) Notice: Subject to any disclaimer, the term of this patent is extended or adjusted under 35 U.S.C. 154(b) by 412 days.

(21) Appl. No.: 12/937,839

(22) PCT Filed: Apr. 14, 2008

(86) PCT No.: PCT/US2008/060221
§ 371 (c)(1),
(2), (4) Date: Oct. 14, 2010

(87) PCT Pub. No.: WO2009/128815
PCT Pub. Date: Oct. 22, 2009

(65) Prior Publication Data
US 2011/0040460 A1 Feb. 17, 2011

(51) Int. Cl.
*B60L 11/18* (2006.01)
(52) U.S. Cl.
USPC .............................................. 701/22; 701/50
(58) Field of Classification Search
USPC ................. 701/50, 22, 90, 91, 69–74, 82, 84, 701/85, 87, 89; 180/197, 65.8, 248; 435/24; 477/3; 318/138; 123/333; 303/159, 148, 303/162, 146, DIG. 6
See application file for complete search history.

(56) References Cited

U.S. PATENT DOCUMENTS

| 5,508,924 | A * | 4/1996 | Yamashita | 701/22 |
| 6,630,320 | B1 * | 10/2003 | Davis et al. | 435/24 |
| 7,314,424 | B2 * | 1/2008 | Supina et al. | 477/3 |

FOREIGN PATENT DOCUMENTS

| JP | 2003111207 A | 4/2003 |
| JP | 2005147056 A | 6/2005 |

OTHER PUBLICATIONS

Office Action from Japanese Patent Office in counterpart Japanese Application No. 2011-503959(9 pages)(Feb. 18, 2013).

* cited by examiner

*Primary Examiner* — Marthe Marc-Coleman

(57) ABSTRACT

A loader vehicle including a frame system, a plurality of wheels, a plurality of drive units and a controller. The plurality of wheels are subject to rapidly changing loads and are associated with the frame system. The plurality of drive units are each associated with a corresponding subset of at least one of the plurality of wheels. The controller is configured to compute a slip error for one of the plurality of wheels dependent on an integral term derived from a wheel speed of at least one other of the plurality of wheels. The controller computes a slip target value for the one wheel. The controller further uses the slip error and the slip target value to arrive at a command that is applied to the drive unit corresponding to the one wheel.

12 Claims, 7 Drawing Sheets

TRACTION CONTROL METHOD AND APPARATUS FOR A VEHICLE WITH INDEPENDENT DRIVES

FIELD OF THE INVENTION

The present invention relates to work machines, and, more particularly, to a method and apparatus for controlling traction of a vehicle with independent drives connected to the wheels.

BACKGROUND OF THE INVENTION

Work machines, such as loaders are often configured with the engine behind the back wheels and the loader portion extending beyond the front wheels. This arrangement allows the weight of the engine to offset the load carried in the bucket of the loader portion. Such an arrangement allows for a significant variation in the amount of weight carried by each of the axles. This in turn is expressed by a varying effective diameter of the wheels and the torque needed to move the loader as the torque is individually applied to each wheel.

The power train in a conventional four-wheel drive loader includes a prime mover, and a device to mechanically couple the prime mover with the various wheels. Conventional power train configurations control excessive wheel spin by mechanically constraining the wheels, either laterally or transversely, or both. This is accomplished by forcing the rotation of the wheels by locking a differential, braking the spinning wheel (U.S. Pat. No. 6,631,320) or by slipping a clutch between the slipping wheel and the differential (U.S. Pat. No. 5,265,705). Under some circumstances wheels are allowed to rotate at different speeds, for instance, while the vehicle is turning or if the tires are of different radii. The disadvantage of the differential lock approach to traction control is that it cannot both reduce excess wheel spin and allow the wheels to rotate at different speeds. A disadvantage of using a brake to reduce wheel spin is that this reduces efficiency and causes extra wear on the brakes and requires independently applied brake systems. The disadvantage of using the clutch to reduce the torque to the slipping wheel is that it requires an additional initial and maintenance cost of the clutch and that the clutch wears as it slips.

LeTourneau has a loader with independent electrically driven wheels, and employs a traction control system that compares each wheel speed against the slowest wheel speed, or against the average wheel speed (U.S. Patent Application Publication No. 20070193794). In the automotive industry, traction is controlled using brakes and/or engine torque reduction methods (U.S. Pat. No. 5,025,882). The traction control effort can be a function of the difference between a wheel speed and a reference speed, the rate change of slip (U.S. Pat. No. 5,025,882), and even an estimation of the roads friction characteristics (U.S. Pat. No. 5,504,680). There are methods in the automotive industry for estimating vehicle speed, including the use of an accelerometer (U.S. Pat. No. 4,884,650), by comparison to undriven tires (U.S. Pat. Nos. 5,492,192 and 5,429,428), adjusting for a change in steering (U.S. Pat. No. 5,429,428), or even a model based predictor using wheel speeds and engine information (U.S. Pat. No. 6,560,539). Due to the cost and potential for failure of each sensor, it is advantageous to use fewer sensors to estimate the reference speed. Model based methods use predetermined estimates of unmeasured model parameters, such as tire radius and vehicle weight. Algorithms may be employed to adjust predetermined parameters that are timed, to account for changes in tire wear or payload. Unlike an automobile, a loader's tire diameter and payload change significantly and dynamically during the course of operation making parameter estimation very difficult.

What is needed in the art is a method and apparatus to control the traction of the wheels of a loader with independent drives.

SUMMARY OF THE INVENTION

The present invention provides a method and apparatus for controlling traction in vehicles with independent driven wheels.

The invention, in one form thereof, is directed to a loader vehicle including a frame system, a plurality of wheels, a plurality of drive units and a controller. The plurality of wheels are subject to rapidly changing loads and are associated with the frame system. The plurality of drive units are each associated with a corresponding one of the plurality of wheels. The controller is configured to compute a slip error for one of the plurality of wheels dependent on an integral term derived from a wheel speed of at least one other of the plurality of wheels. The controller computes a slip target value for the one wheel. The controller further uses the slip error and the slip target value to arrive at a command that is applied to the drive unit corresponding to the one wheel.

The invention, in yet another form thereof, is directed to a method of applying torque to ground engaging wheels of a loader vehicle including the steps of computing a slip error, computing a slip target value and applying a torque. The computing a slip error step computes the slip error for at least one of the wheels using speed information of at least two other wheels. The computing a slip target value step computes a slip target value dependent upon an articulation angle and wheel speeds. The applying a torque step includes applying a torque to a wheel dependent upon the slip error and the slip target value associated with each wheel.

DETAILED DESCRIPTION OF THE INVENTION

Figure 1:
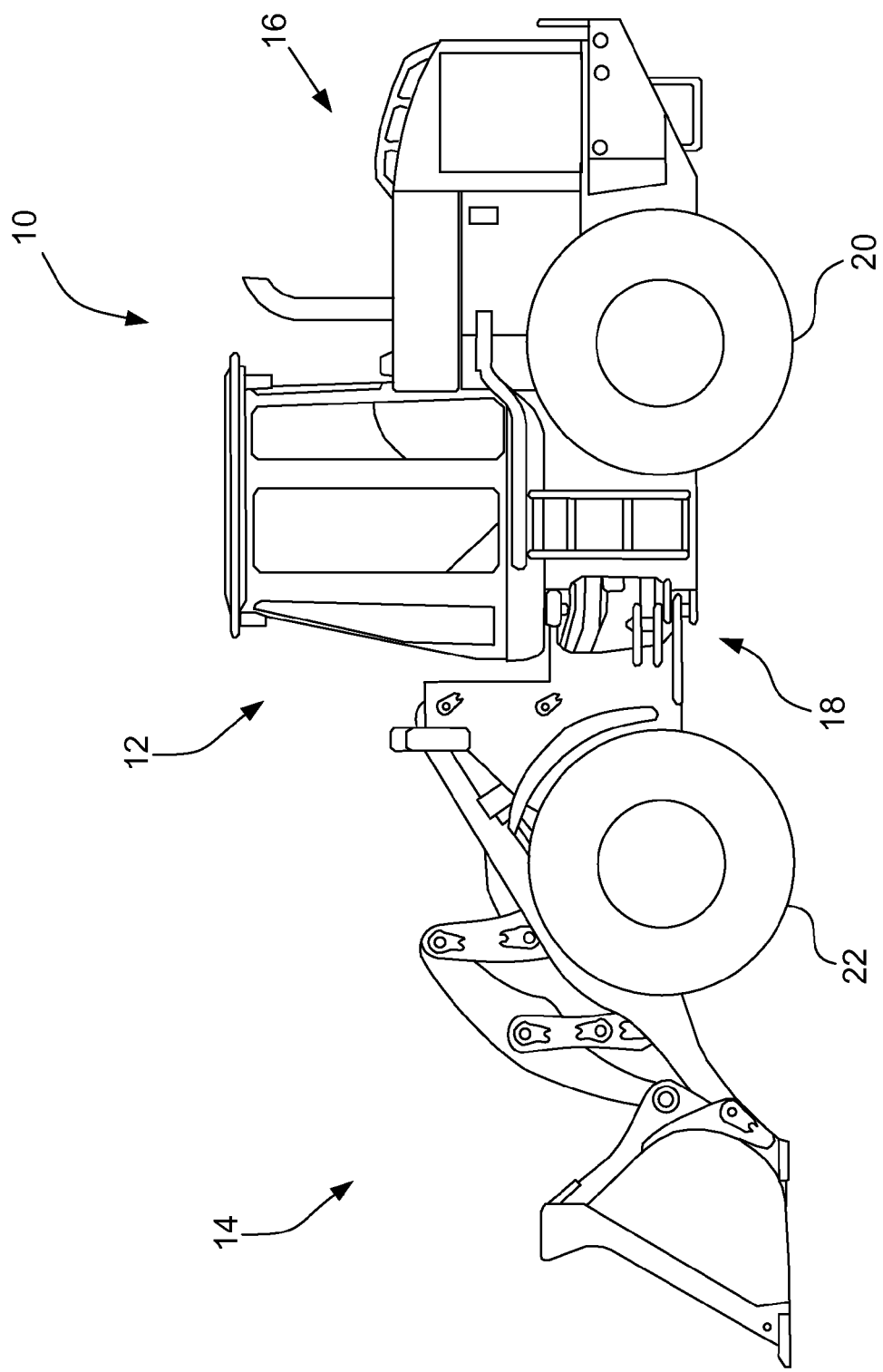
FIG. 1 is a side view of an exemplary work machine in accordance with an embodiment of the present invention.
Figure 2:
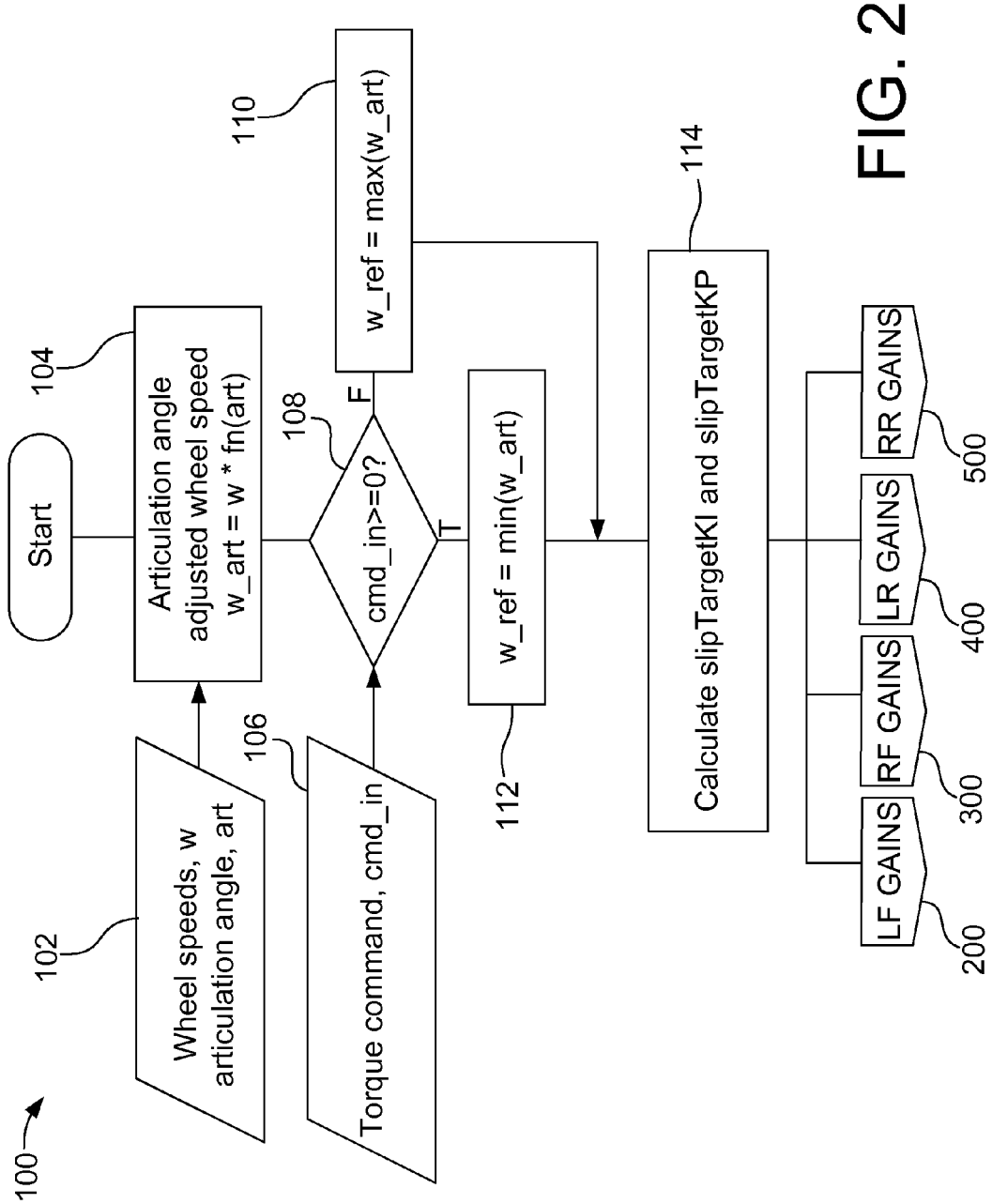
FIGS. 2, 3 and 4 are flow charts depicting a method for controlling traction of the loader depicted in FIG. 1.

Referring now to the drawings, there is shown a work machine 10 in accordance with an embodiment of the present invention. Work machine 10 may be used for performing, for example, agricultural, industrial, construction, forestry work and/or mining operations, and may be an articulated wheel driven loader 10. Work machine 10 is a payload carrying vehicle that generally carries the payload in a manner that is exposed to the elements and is a load that can vary rapidly and/or be distributed in the load carrying portion in an uneven, unpredictable manner. For purposes of this application a loader vehicle shall include vehicles that have at least two drive units including a loader, a skid steer loader, a backhoe, a fork lift, a dump truck, a log skidder, a feller buncher, a log harvester, a log forwarder, and a vehicle that has an apparatus that can pick up a load from the ground.

Loader 10 includes a cab 12 in which the operator is housed along with controls for the control of the functions of loader 10. Loader 10 includes a front section, illustrated as a loader section 14 and a rear section, illustrated as a power section 16. Loader section 14 and power section 16 are connected at an articulation point and move relative to each other about this point by way of an articulation section 18.

Loader 10 includes wheels 20, 22, 24 and 26; each driven by a separate drive mechanism, such as motors 32. Drive system 28 includes a controller 30 that is connected with motors 32, and sensors 34. Motors 32 may be electrically driven drive units each being associated with an individual wheel 20, 22, 24 and 26. Sensors 34 detect, among other things, the rotational speed of each of wheels 20, 22, 24 and 26.

Figure 8:
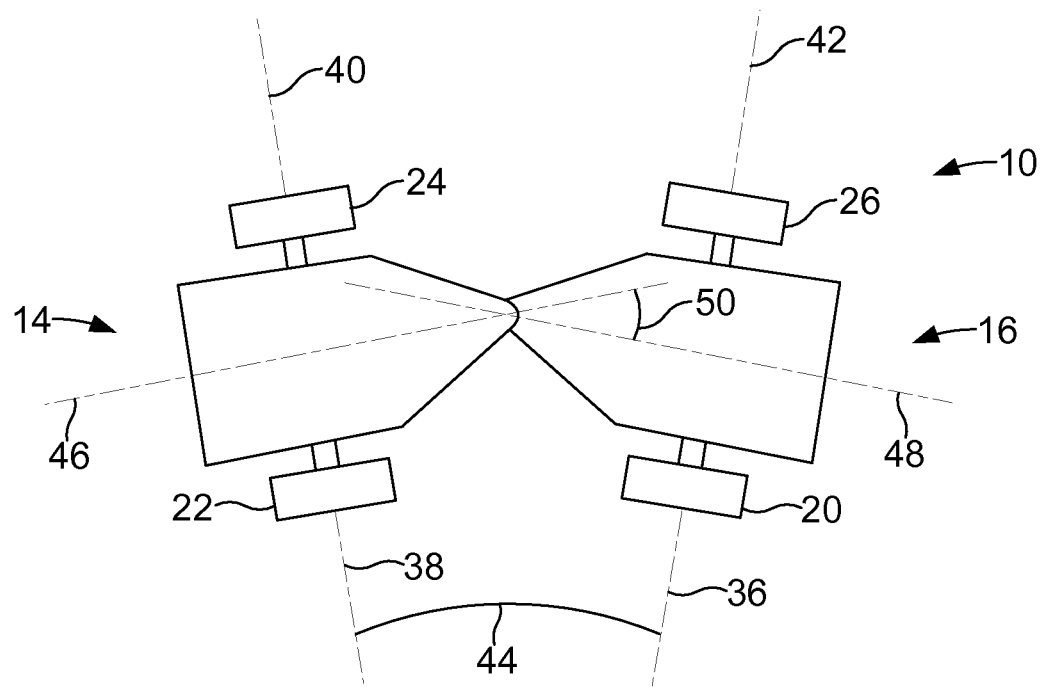
FIG. 8 is a schematical representation of an articulated vehicle, such as the loader of FIG. 1.

Wheel 20 rotates about an axis 36, wheel 22 rotates about an axis 38, wheel 24 rotates about an axis 40, and wheel 26 rotates about an axis 42. Axes 38 and 40 may be coaxial and in a like manner axes 36 and 42 may be coaxial. An angle 44 may be described as existing between the coaxial axes as illustrated in FIG. 8. Center line 46 of loader section 14 and center line 48 of power section 16 form an angle 50 known as the articulation angle between section 14 and 16, which corresponds to angle 44.

In one embodiment of the present invention, power section 16 includes an engine that may be electrically or hydraulically coupled to drive units in each of wheels 20, 22, 24 and 26. Although the drive units may be of any type, for the ease of explanation the drive units will be considered electrically driven motors that are independently driven at a commanded torque with the command being issued from controller 30. The present invention affords the opportunity to provide a traction control system that both prevents excessive wheel slip and allows kinematically optimal wheel speed differences, without excessive energy loss, by directly adjusting the torque applied to each wheel responsive to the perceived wheel slip.

In an embodiment of a method of the present invention illustrated as method 100, wheel speeds was well as the articulation angle (art) are sensed by sensors 34 and communicated to controller 30 at step 102. In step 104, the articulation angle is used to calculate the wheel speed that is adjusted for the articulation angle that is commanded by the operator. A function of the articulation angle is multiplied by the measured wheel speed and is used to compute the wheel speed that is adjusted for the steering angle (w_art).

Figure 3:
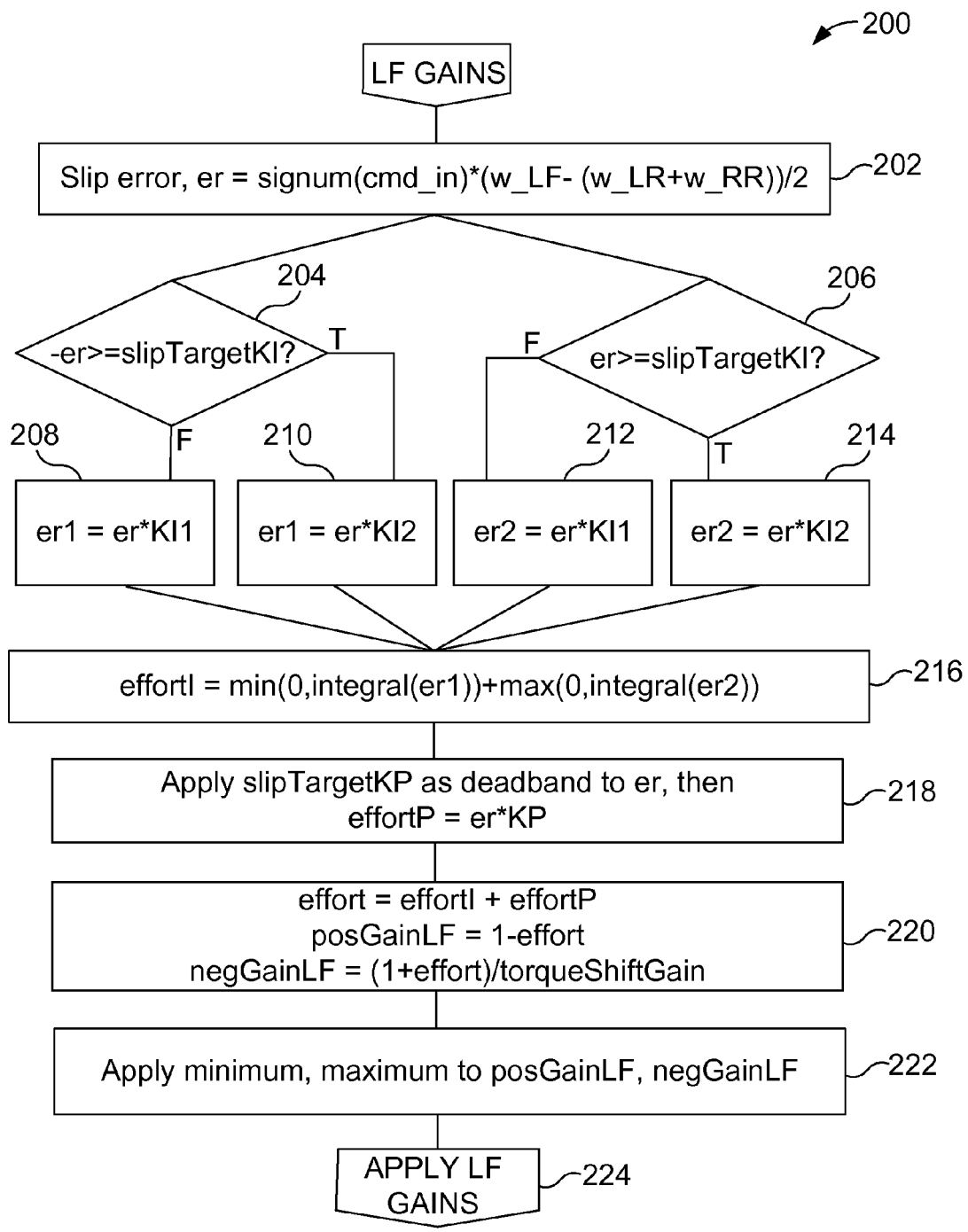
Figure 5:
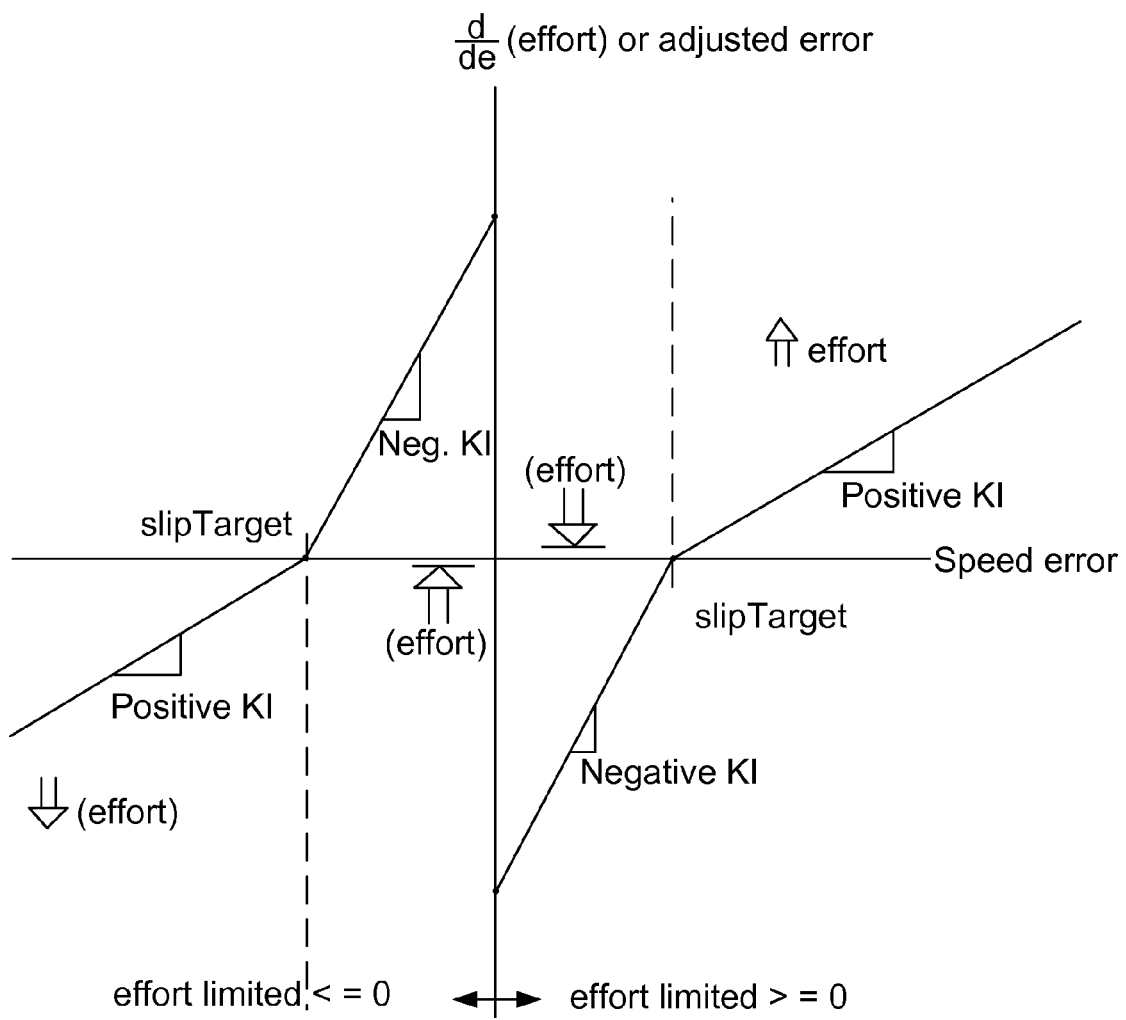
FIG. 5 is a graph utilized to help describe the present invention utilized in FIGS. 1-4.
Figure 6:
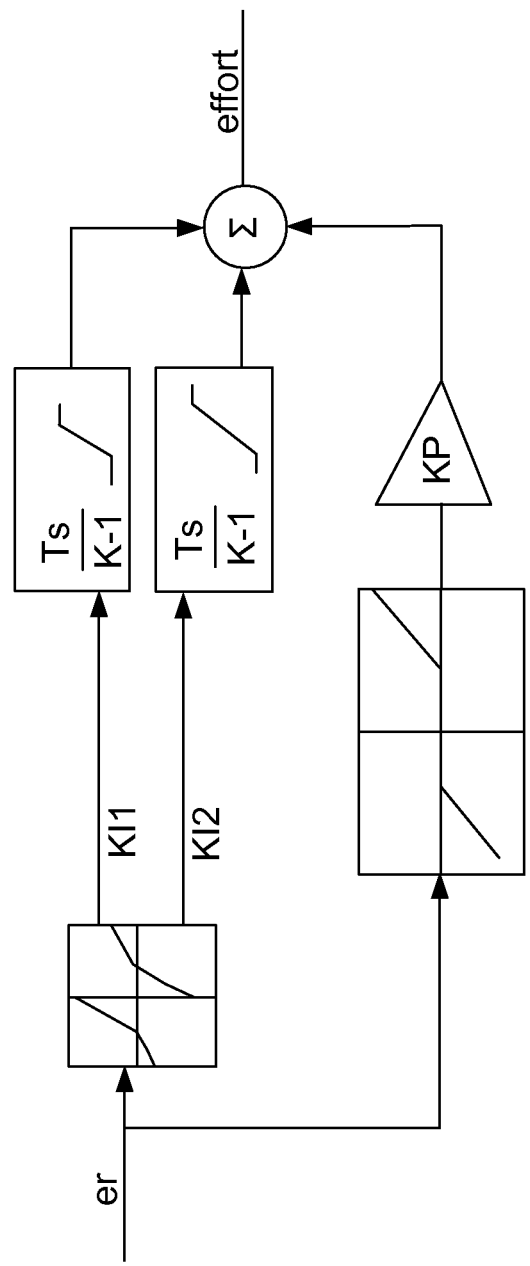
FIG. 6 is a schematicized control circuit illustrating functions of the present invention.
Figure 7:
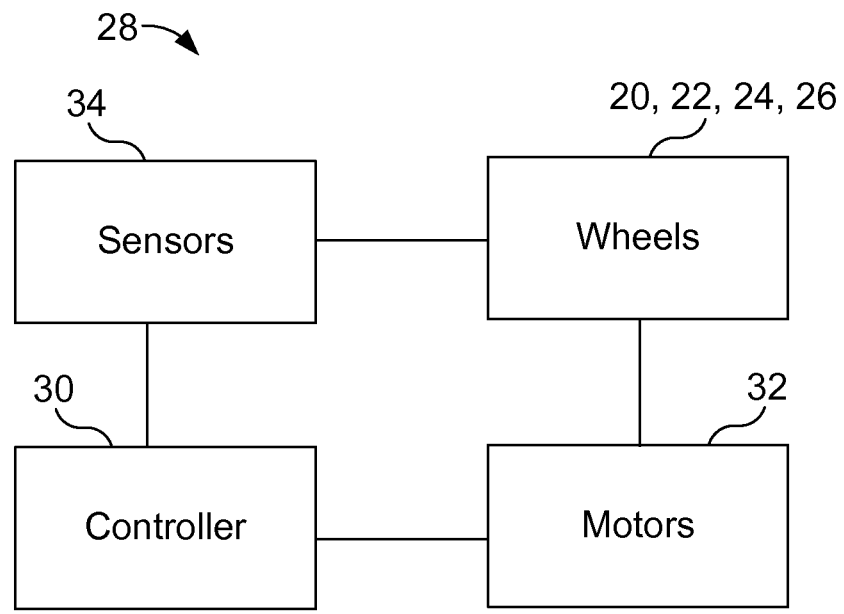
FIG. 7 is a schematical representation of a drive system utilized in the loader and method of FIGS. 1-6.

At step 106, a torque command (cmd_in) is received from the operator and if the torque command is not greater than or equal to zero at step 108, method 100 proceeds to step 110 in which case the wheel speed reference (w_ref) is set equal to the maximum value of the wheel speed articulation values. If the commanded torque is greater than or equal to zero, then method 100 proceeds to step 112 in which the wheel speed reference is set equal to the minimum value of the wheel articulation speeds. These steps estimate the vehicle speed, which is now referred to as w_ref. At step 114, slip targets are calculated in the form of slipTargetKI and slipTargetKP. These are calculated as a function of the wheel speed reference w_ref. The slipTarget values are limited according to a predetermined minimum and maximum value as illustrated in FIG. 5. At this point, method 100 proceeds to calculate gains for each of the wheels by way of methods 200, 300, 400 and 500 since methods 300, 400 and 500 are substantially similar to method 200 only method 200 is illustrated herein. The left front wheel gain is calculated in method 200 as illustrated in FIG. 3. The slip error (er) is equal to the command direction (cmdDir) (which is equal to signum (cmd_in)) times the speed of the left front wheel minus the average speed of the left rear and right rear wheels, as illustrated in step 202. At this point the error er is compared to the slipTargetKI. If the negative error is greater than or equal to the slipTargetKI, then the method proceeds to step 210, if this statement is false then method 200 proceeds to step 208. The positive error is also compared to the slipTargetKI and if greater than or equal to the slipTargetKI, then method 200 proceeds to step 214 otherwise it proceeds to step 212. At steps 208, 210, 212 and 214, selectively, error one (er1) and error two (er2) are calculated. At step 216, effortI is calculated using the slipTargetKI as the reference in applying one of two gains, depending upon the magnitude of the error, such that the increase of effort is governed by one gain, while the reduction of effort is governed by a second gain. At step 218, the slipTargetKP is applied as a deadband to the error er and then the effortP is set equal to error er times KP. This calculation of the proportional effort (effortP) is a function of the portion of error er greater than the slipTargetKP (if er >0) or is a function of the portion of error er less than the −slipTargetKP (if er <0). At step 220, the effort is calculated as the sum of effortI+effortP. The positive gain to be associated with the left front wheel is equal to one minus the effort and the negative gain is equal to the quantity one plus effort divided by the torque shift gain, where the torque shift gain is a predetermined value that governs the torque reallocation in the system. The limits are applied at step 222 to the positive gainLF and negative gainLF by limiting them to predetermined minimum and maximum values. At this point, method 200 then goes to step 224 where the left front wheel gains are applied. This sequence, as illustrated in method 200 with appropriate references to other wheel speeds, is repeated in methods 300, 400 and 500 for the other wheels.

Figure 4:
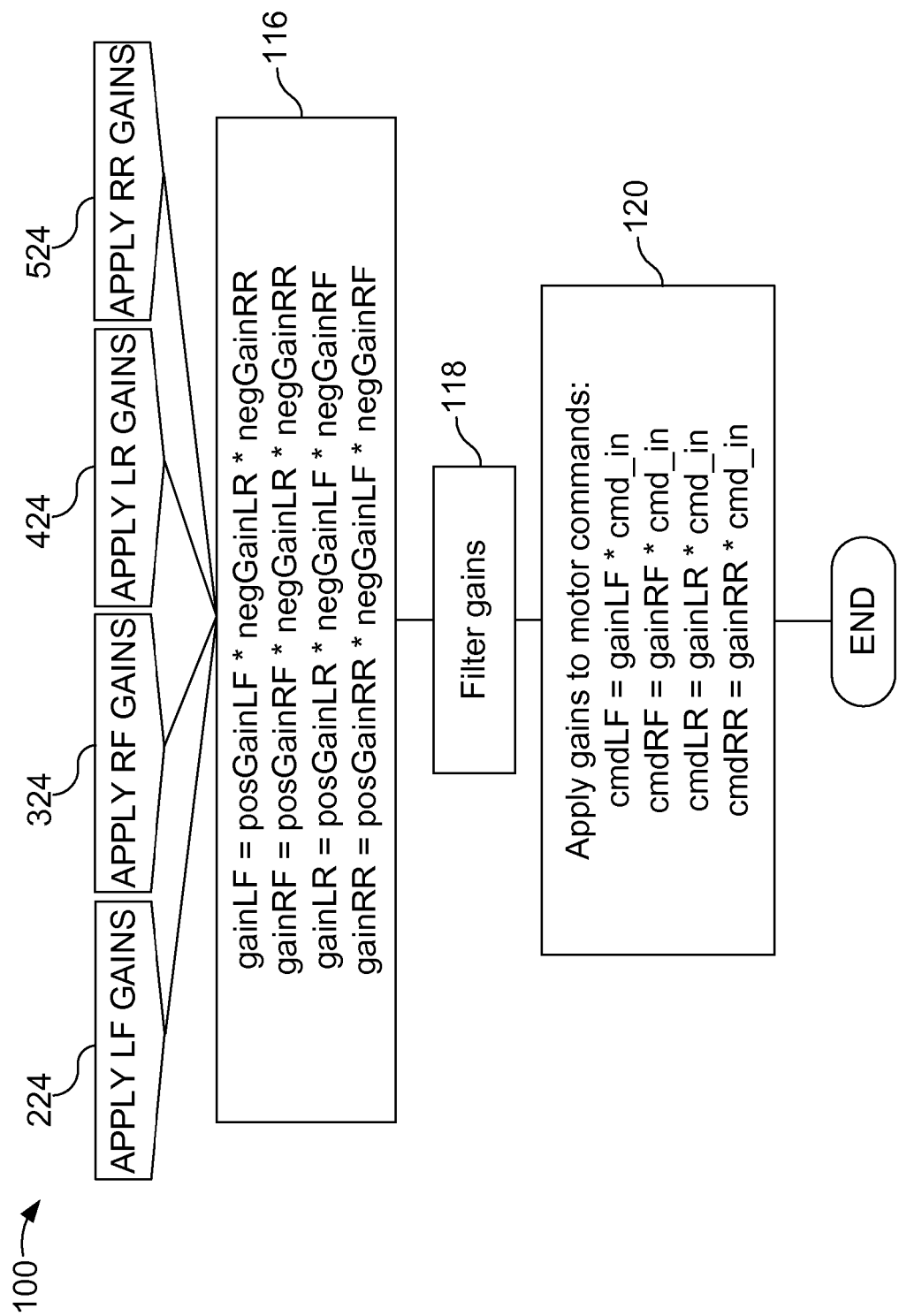

The gains for each of the wheels is calculated in step 116 (see FIG. 4) as the product of the positive gain for that wheel times the negative gain of the wheel on an opposite axle and times the negative gain of the other wheel on the opposite axle. The gains are filtered at step 118 using a variable corner first-order low-pass filter, where the pole has a lower limit, and the pole location of the filter is a function of the rate of change of the input. At step 120, the commands are calculated that are to be applied to each of the motors for each of the wheels by multiplying the command input times the gain for each of the respective wheels to result in the command to be issued to each of the drive units associated with the wheels.

The foregoing method having been described as issuing a command for each wheel, can in a similar manner be applied to associated wheels in the event that there is not a drive for each wheel. For example, if there are two drives, one for a front set of wheels and one for a rear set of wheels the method can be adapted to issue a command to each of the two drives, with each drive being associated with a subset of all of the wheels.

The behavior of the method of the present invention can be adjusted by changing the values of the various parameters. The size and lower limits of the slip targets govern the amount of slip allowed, especially at low speeds. The relative magnitude of the two integral gains and the integral slipTarget determines how quickly tractive effort is reapplied once a slip has occurred. The variable corner filter parameters govern how quickly the tractive effort itself is applied. The selection of limits and gains for the positive and negative gains associated with each calculation determines whether and to what degree the algorithm will reallocate tractive effort to non-slipping wheels in an effort to maintain overall tractive effort.

The magnitude of the proportional and integral gains, and the relative magnitude of these gains as applied to the front and rear wheels, governs whether the tractive effort is reallocated mostly longitudinally or transversely from a single slipping wheel.

An advantage of the algorithm of the present invention is that it does not require an additional manner of estimating a reference speed, and it does not make the assumption that the vehicle mass or the wheel radii are slow to change, which is common in the prior art. The advantage of this method over a slowest wheel or average wheel speed method is that it gives an estimation of which wheels could apply increased tractive effort without excessive slip. It allows for the tractive capacity of a subset of the wheels to exceed the desired total tractive capacity of the vehicle, so that the desired total tractive capacity can be achieved even if a subset of the wheels has reached its tractive limit, and the application of that excess tractive effort is a function of the desired total tractive effort and the available tractive effort of each wheel, as governed by the tractive conditions at that wheel. It also advantageously reallocates the torque in a desirable way in response to one or two tires slipping. The benefit of the integral element of this scheme is that it allows tighter control of vehicle slip, and the method for controlling how quickly the tractive effort is removed to prevent slip, and is reapplied to gain maximum tractive effort.

A definition of many of the variables used above and in the figures follows for the purposes of reference thereto:

art articulation or steering angle cmd_in torque command before traction control adjustment is applied cmdLF, traction control adjusted torque command to left front wheel, cmdRF, traction control adjusted torque command to right front wheel, cmdLR, traction control adjusted torque command to left rear wheel, cmdRR, traction control adjusted torque command to right rear wheel.

effortI integral component of control effort effortP proportional component of control effort er slip error, difference between wheel speed and reference wheel speed gainLF multiplier used to reduce torque command to left front wheel gainLR multiplier used to reduce torque command to left rear wheel gainRF multiplier used to reduce torque command to right front wheel gainRR multiplier used to reduce torque command to right rear wheel KI1 integral gain used when magnitude of speed difference, slip error er, exceeds reference speed difference, slipTargetKI KI2 integral gain used when magnitude of speed difference, slip error er, is less than reference speed difference, slipTargetKI negGainLF multiplier used to increase magnitude of torque command to other wheels, if left front wheel is slipping posGainLF multiplier used to reduce magnitude of torque command to left front wheel, if it is slipping reference wheel speed speed calculated from one or more wheel speeds used to determine degree of wheel slip slipTargetKI reference speed difference, used in integral control calculation slipTargetKP reference speed difference, used in proportional control calculation w collectively, wheel speeds as measured w_art collectively, wheel speeds adjusted for steering angle; equivalent center-line speeds, or equivalent straight-travel speeds w_LF left front wheel center-line (steering adjusted) speed w_LR left rear wheel center-line speed w_ref reference wheel speed calculated from one or more wheel speeds, used to determine wheel slip w_RF right front wheel center-line speed w_RR right rear wheel center-line speed Having described the preferred embodiment, it will become apparent that various modifications can be made without departing from the scope of the invention as defined in the accompanying claims.

The invention claimed is:

1. A loader vehicle, comprising:
   a frame system;
   a front pair of wheels and a rear pair of wheels being respectively individually mounted to front and rear pairs of axles and being subject to rapidly changing loads, and said front and rear pairs of wheels being associated with said frame system;
   front and rear pairs of drive units respectively, being associated with said front and rear pairs of wheels; and
   a controller being configured to compute a slip error for each wheel of said front and rear pairs of wheels, with each computation being dependent on an integral term derived from multiplying an operator torque command directed to one wheel of one of said front and rear pairs of wheels times a measured wheel speed of said one wheel minus the average speed of the pair of wheels of another of said front and rear pairs of wheels, and to compute a slip target value for said one wheel, said controller further being configured to use said slip error and said slip target value to arrive at an adjusted torque command that is applied to the one of said front and rear pairs of drive units that is associated with said one wheel.

2. The loader vehicle of claim 1, wherein said front pair of axles are substantially coaxial, and said second pair of axles are substantially coaxial.

3. The loader vehicle of claim 1, wherein said controller is configured to compute each said slip target value dependent upon an articulation angle corresponding to an angular difference between a first axis along which said front pair of axles are disposed and a second axis along which said rear pair of axles are disposed.

4. The loader vehicle of claim 1, wherein said slip target value for said one wheel includes a dead band within which said controller does not alter said torque command.

5. The loader vehicle of claim 4, wherein said controller arrives at a new torque command if said slip error is outside of said dead band.

6. A drive system for a loader vehicle having right and left front wheels and right and left rear wheels a plurality of wheels, the drive system, comprising:
   right and left front drive units respectively associated with said right and left front wheels, and right and left rear drive units respectively associated with said right and left rear wheels; and
   a controller configured to compute a slip error for each of said right and left front and right and left rear wheels, with each computation being dependent on an integral term derived from multiplying an operator torque command directed to one wheel of either said right and left front wheels or said right and left rear wheels times a measured wheel speed of said one wheel minus the average speed of the right and left wheels of another of said front and rear wheels, and to compute a slip target value for said one wheel, said controller further being configured to use said slip error and said slip target value to arrive at an adjusted torque command that is applied to that one of said left and right front and rear pairs of drive units that is associated with said one wheel.

7. The loader vehicle of claim 6, wherein said left and right front wheels are associated with a first axis of rotation and said left and right rear wheels are associated with a second axis of rotation.

8. The loader vehicle of claim 7, wherein said controller is configured to compute said slip target value dependent upon an articulation angle corresponding to an angular difference between said first axis and said second axis.

9. The loader vehicle of claim 8, wherein each said adjusted torque command corresponds to a desired application of torque by a corresponding drive unit.

10. The loader vehicle of claim 6, wherein said slip target value includes a dead band within which said controller does not alter said torque command.

11. The loader vehicle of claim 10, wherein said controller arrives at a new torque command if said slip error is outside said dead band.

12. A method of applying torque to ground engaging wheels of a loader vehicle including a front pair of right and left wheels mounted to a front frame section for individual rotation about a first transverse axis, a rear pair of right and left wheels mounted to a rear frame section for individual rotation about a second transverse axis, and said front and rear frame sections being coupled together for selected articulation relative to each other about an upright axis, comprising the steps of:

computing a slip error for each wheel using a configurable controller, the computation including multiplying an operator commanded torque for one wheel of either the front pair of wheels or the rear pair of wheels times a quantity equal to a speed of the one wheel minus an average of the speed of the wheels of the other of the front and rear pair of wheels;

computing a slip target value for each wheel using the configurable controller, dependent upon an articulation angle between the first and second axes and wheel speeds; and applying a torque to said one wheel dependent upon said slip error and said slip target value associated with said one wheel.

* * * * *